(12) United States Patent
Lee (10) Patent No.: US 11,237,785 B2
(45) Date of Patent: Feb. 1, 2022

(54) IMAGE FORMING APPARATUS TO PRINT TRACEABLE PRINTOUT

(71) Applicant: Hewlett-Packard Development Company, L.P., Spring, TX (US)

(72) Inventor: Do Soon Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/050,625

(22) PCT Filed: Dec. 13, 2018

(86) PCT No.: PCT/KR2018/015828
§ 371 (c)(1),
(2) Date: Oct. 26, 2020

(87) PCT Pub. No.: WO2020/036264
PCT Pub. Date: Feb. 20, 2020

(65) Prior Publication Data
US 2021/0240417 A1    Aug. 5, 2021

(30) Foreign Application Priority Data

Aug. 16, 2018  (KR) .................. 10-2018-0095363

(51) Int. Cl.
*G06F 3/12* (2006.01)
*H04N 1/00* (2006.01)
*H04N 1/32* (2006.01)

(52) U.S. Cl.
CPC .......... *G06F 3/1238* (2013.01); *G06F 3/129* (2013.01); *G06F 3/1222* (2013.01); *G06F 3/1243* (2013.01); *H04N 1/00244* (2013.01); *H04N 1/00851* (2013.01); *H04N 1/32144* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,514,456 | B2 | 8/2013 | Tanaka |
| 2005/0225080 | A1 | 10/2005 | Wicker |
| 2007/0223038 | A1 | 9/2007 | Sato |
| 2008/0158578 | A1 | 7/2008 | Kadota |
| 2009/0001710 | A1 | 1/2009 | Wicker |
| 2009/0310191 | A1 | 12/2009 | Takahama et al. |
| 2010/0188675 | A1 | 7/2010 | Tanaka |
| 2011/0007350 | A1 | 1/2011 | Chung |
| 2011/0128566 | A1 | 6/2011 | Eum et al. |
| 2016/0364550 | A1 | 12/2016 | Pathak |

FOREIGN PATENT DOCUMENTS

| | | | |
|---|---|---|---|
| CN | 101795337 | A | 8/2010 |
| JP | 2007-166342 | A | 6/2007 |
| JP | 2008-182552 | A | 8/2008 |
| JP | 2010-21848 | A | 1/2010 |
| KR | 10-1339306 | B1 | 12/2013 |

*Primary Examiner* — Lennin R Rodriguezgonzalez
(74) *Attorney, Agent, or Firm* — Jefferson IP Law, LLP

(57) ABSTRACT

An image forming apparatus is provided. The image forming apparatus includes a print engine, a communication apparatus to receive print data, and a processor to generate an intrinsic dot pattern for the print data, to generate a print image including the intrinsic dot pattern by using the generated intrinsic dot pattern and the print data, and to control the print engine to print the generated print image.

20 Claims, 3 Drawing Sheets

IMAGE FORMING APPARATUS TO PRINT TRACEABLE PRINTOUT

BACKGROUND ART

An image forming apparatus generally operates to print out print data generated at a print control terminal such as a computer onto a printing paper. Examples of an image forming apparatus may include a copier, a printer, a scanner, a facsimile, or a multi-function peripheral (MFP) in which the above functions are combined and implemented in one apparatus.

DISCLOSURE OF INVENTION

BRIEF DESCRIPTION OF DRAWINGS

The above and other aspects, features, and advantages of certain examples of the disclosure will be more apparent from the following description taken in conjunction with the accompanying drawings, in which.

The same reference numerals are used to represent the same elements throughout the drawings.

MODE FOR THE INVENTION

One or more examples will be described below in greater detail with reference to the accompanying drawings. The examples described below may be modified and implemented in various different forms. In order to more clearly describe the features of the examples, a detailed description of known matters to those skilled in the art will be omitted.

In the present disclosure, a case in which any one feature is connected with another feature includes a case in which the features are directly connected with each other and a case in which the parts are indirectly (e.g., electrically) connected with each other with one or more other features interposed therebetween. Further, when a first certain feature is stated as "comprising" another certain feature, unless otherwise stated, this means that the first certain feature may include other features, rather than foreclosing the same.

The term "image forming job" as used herein may mean various jobs related to the image (e.g., printing, copying, scanning, or faxing), such as forming an image or creating/storing/transmitting an image file. In addition, the term "job" may mean not only an image forming operation but also a series of processes necessary for performing an image forming operation.

An image forming apparatus generally operates to print out print data generated at a terminal such as a computer onto a printing paper. An example of an image forming apparatus includes a copier, a printer, a scanner, a facsimile, and a multi-function printer (MFP) that provides combined functionality of at least two of the single apparatuses. The image forming apparatus may refer to any apparatus capable of performing an image forming operation, such as a copier, a printer, a scanner, a fax machine, an MFP, a display apparatus, or the like.

In addition, the term "hard copy" may refer to an operation of outputting an image on a printing medium such as paper, and the like, and "soft copy" may refer to an operation of outputting an image to a display apparatus, such as TV, monitor, and the like, or to a memory.

In addition, the term "content" may refer to any type of data that is subject to an image forming operation, such as a photo, an image, a document file, or the like.

In addition, the term "print data" may refer to data that is converted into a format printable in a printer. Meanwhile, if a printer supports direct printing, the file itself may be print data.

In addition, the term "user" may refer to a person who performs an operation related to an image forming operation using an image forming apparatus or a device connected to the image forming apparatus via wire or wirelessly. In addition, the term "manager" may refer to a person who has the authority to access all functions and the system of the image forming apparatus. The "manager" and the "user" may be the same person.

Figure 1:
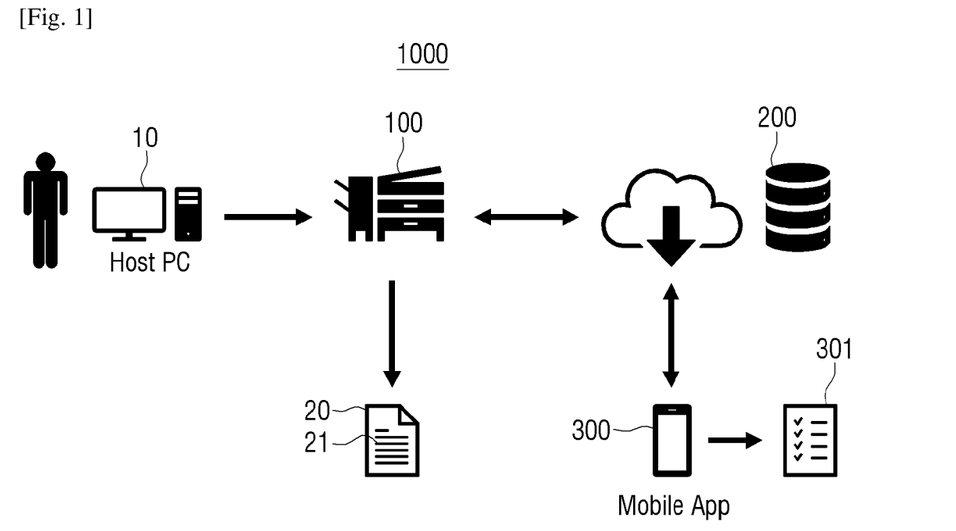
FIG. 1 is a diagram illustrating an image forming system, according to an example.

FIG. 1 is a diagram illustrating an image forming system, according to an example.

Referring to FIG. 1, an image forming system 1000 may include a print control terminal 10, an image forming apparatus 100, a management server 200, and a mobile apparatus 300.

When a print command for a document (or content) is received from a user, the print control terminal 10 may generate print data for the document, and transmit the generated print data and information relating to the document (or information relating to the print data) to the image forming apparatus 100. In a case in which the image forming apparatus 100 supports direct printing, the print control terminal 10 may transmit the content itself to the image forming apparatus 100 as print data.

The information relating to the document may include information relating to a person who generated the document for which the print command is received, information relating to a name of the document, information relating to a date of generation of the document, etc.

In addition, the information relating to the document may include security term information or information relating to whether the document is a security document and information relating to the print control terminal 10 (e.g., a MAC address, internet protocol (IP) address, etc. of the print control terminal 10).

The security term information may be information that relates to a term by which it is necessary to maintain security of the corresponding document, which may be defined as a period for which the security is to be maintained (e.g., 3 months), may be defined as a final due date on which the period is terminated (e.g., Dec. 30, 2018), etc. In an example, the document information described above may be provided to the image forming apparatus as printer job language (PJL) information.

The print control terminal 10 may be an electronic apparatus which provides print data, and may be, for example, a personal computer (PC), a notebook PC, a tablet PC, a smartphone, a server, and the like.

The image forming apparatus 100 may receive print data from the print control terminal 10, and print the received print data. The image forming apparatus 100 may generate an intrinsic (e.g., unique) dot pattern for the received print data, and print a print image having the generated dot pattern. Accordingly, a printout 20 from the image forming apparatus 100 may include a dot pattern 21.

In an example, the image forming apparatus 100 may transmit information relating to a document received from the print control terminal 10 to the management server 200, and receive information relating to a document ID from the management server 200. In addition, the image forming apparatus 100 may generate a dot pattern including the received document ID information.

The document ID information may be intrinsic identification information (ID) for tracking print data, which may include numbers and/or characters. In addition, the dot pattern may be a pattern that includes dots including information, such as a barcode or a quick response (QR) code. A dot pattern according to an example may include document ID information described above. In an example, the dot pattern may include yellow dots. Examples of a constitution and operation of the image forming apparatus 100 will be described below by referring to FIGS. 3 and 4.

The management server 200 may receive document information for print data from the image forming apparatus 100, and generate a document ID corresponding to the received document information. In addition, the management server 200 may store the received document information and the document ID, and transmit the generated document ID to the image forming apparatus 100. Examples of a constitution and operation of the management server 200 will be described below by referring to FIG. 5.

The mobile apparatus 300 may manage document information stored in the management server 200. In an example, printing of a document is processed in the print control terminal 10 and thus, when the document information for the document is received in the management server 200, the management server 200 may notify the mobile apparatus 300 of an event that a new print job is performed. The mobile apparatus 300 may be an electronic apparatus which is capable of communicating with the management server 200, and may be, for example, a personal computer (PC), a notebook PC, a tablet PC, a smartphone, and the like.

The mobile apparatus 300, which is notified of such event, may display corresponding document information 301 to a manager. The manager may newly input or modify a security term for the corresponding document by means of the mobile apparatus 300, and set whether a second job for a printout of the corresponding document (e.g., scan and/or copy of the printout) is available.

The mobile apparatus 300 may transmit information set by the manager to the management server 200. The management server 200 may update the stored document information based on the received setting information.

In addition, the mobile apparatus 300 may, in a case in which a document having a dot pattern is captured (e.g., photographed), display document information for the corresponding document. In an example, the mobile apparatus 300 may sense a dot pattern from the captured image, identify document ID information of the sensed dot pattern, and transmit the identified document ID information to the management server 200. The mobile apparatus 300 may also receive document information corresponding to the document ID from the management server 200.

As described above, an image forming system according to an example may print a print image including a unique dot pattern at the time of printing of print data. Thus, it is possible to not only prevent a second job for a printout having a dot pattern from being carried out, but also track a job history for the corresponding printout. An example operation of an image forming system in a case in which a scan or copy job for a printout having a dot pattern will be described below, with reference to FIG. 2.

In FIG. 1, the print control terminal 10 and the image forming apparatus 100 are illustrated as directly connected to each other and the image forming apparatus 100 and the management server 200 are directly connected to each other as well. However, in an implementation, each of the devices may be connected via another apparatus such as a router, a wireless router, and the like.

In addition, in FIG. 1, a document ID is generated on the management server 200 side and provided to the image forming apparatus 100. However, in an example, the image forming apparatus 100 may directly generate a document ID. In addition, the document information and the generated document ID may be stored in the image forming apparatus 100 as well, rather than in the management server 200.

An example has been described in which the management server 200 generates only a document ID and provides it to the image forming apparatus 100. However, in other examples, the management server 200 may generate a dot pattern corresponding to the document ID as well and provide the generated dot pattern to the image forming apparatus 100 so that the image forming apparatus 100 may use the provided dot pattern.

In an example illustrated in FIG. 1, print data is received from the print control terminal 10 and a print job is performed. However, in other examples, in a case in which a document or print data is pre-stored in the image forming apparatus 100 or a document stored in a portable storage medium (not illustrated) is connected to the image forming apparatus 100 and printed, or even when a manuscript is copied, the above-mentioned operation may be applied.

Also, in the example of FIG. 1, it is described that identification, modification, etc. for document information is performed in the mobile apparatus 300. However, in other examples, the management server 200 may perform the operation of the mobile apparatus 300 mentioned above.

Figure 2:
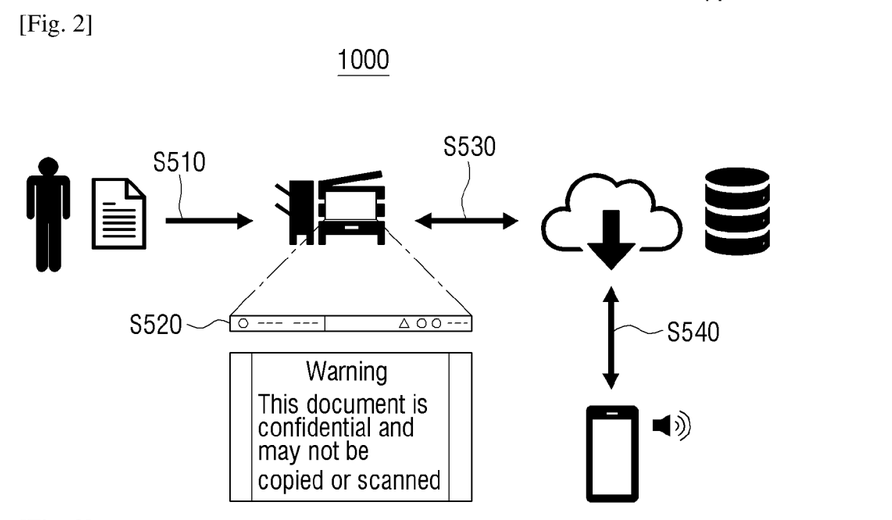
FIG. 2 is a diagram provided to explain an operation in a case of performing a scan job or a print job for a printout having a dot pattern, according to an example.

FIG. 2 is a diagram provided to explain an operation in a case of performing a scan job or a print job for a printout having a dot pattern, according to an example.

Referring to FIG. 2, to perform a scan or copy operation, a user may move to the image forming apparatus 100, and proceed with a login procedure to use the image forming apparatus 100. The login procedure may be performed by an operation of tagging using radio-frequency identification (RFID) including user information or by inputting an ID, a password, etc.

After the login procedure, a user may load a manuscript for a scan job or a copy job, and input a scan command or a copy command to the image forming apparatus 100 at operation S510.

The image forming apparatus 100, which received a scan command or a copy command may scan a loaded manuscript and generate a scan image. Thereafter, the image forming apparatus 100 may identify whether a dot pattern is present in the scan image.

When a dot pattern is not present in the scan image, the image forming apparatus 100 may perform an operation requested by the user. In an implementation, the image forming apparatus 100 may perform a job as illustrated in FIG. 1 (i.e., a job of adding a dot pattern to the scan image).

If a dot pattern is present in the scan image, the image forming apparatus 100 may not perform a job requested by the user according to a system setting, or may selectively perform the requested job.

For example, in a case in which a system setting indicates that a user job is not to be performed when a dot pattern is sensed, the image forming apparatus 100 may display a message indicating that scanning or copying of the corresponding manuscript is unavailable, at operation S520. The image forming apparatus 100 may acquire a document ID from the dot pattern, and transmit, to the management server 200, the acquired document ID and information relating to a user who requested a job for the manuscript having the dot pattern, at operation S530. The management server 200 may store the received history and notify the mobile apparatus 300 of the stored history, at operation S540. Accordingly, the image forming system 1000 may manage not only use history for a document but also information about the user.

In a case in which a system setting indicates that a job is selectively performed when a dot pattern is sensed, the image forming apparatus 100 may acquire a document ID from the dot pattern, and identify document information corresponding to the acquired document ID. In an example, in a case in which the document information is stored in the image forming apparatus 100, the image forming apparatus 100 may search for document information corresponding to the document ID from among document information stored in the image forming apparatus 100. If the document information is stored in the management server 200, the image forming apparatus 100 may request the management server 200 for document information corresponding to the document ID and receive it.

In addition, the image forming apparatus 100 may identify whether it is possible to perform a job requested by a user based on the identified document information. In an example, the image forming apparatus 100 may identify whether a security term has expired based on security term information in the document information. In an example, the image forming apparatus 100 may determine whether it is possible to perform a job requested by the user by identifying whether the job requested by the user corresponds to whether a second job for a printout is available. For example, when only a scan job for a printout is available at the time of initial printing of a document and it is a scan job that is requested by a user, it may be identified that it is possible to perform the corresponding job. In addition, for example, when a security term is set to Aug. 8, 2018 but a date of work is Aug. 9, 2018, the image forming apparatus 100 may identify that it is not possible to perform the job requested by the user.

In the examples described above, the image forming apparatus 100 directly identifies whether it is possible to perform a user requested job. However, in an example, the image forming apparatus 100 may transmit information relating to the user requested job and the acquired document ID to the management server 200 and the management server 200 may identify whether it is possible to perform the user requested job. The image forming apparatus 100 may directly use the determination of the management server 200.

As described above, the image forming apparatus 1000 may, for example, control whether to perform a second printing for a document having a dot pattern, and track information relating to a user who printed the corresponding document, a user who requested a current job, or the like.

Figure 3:
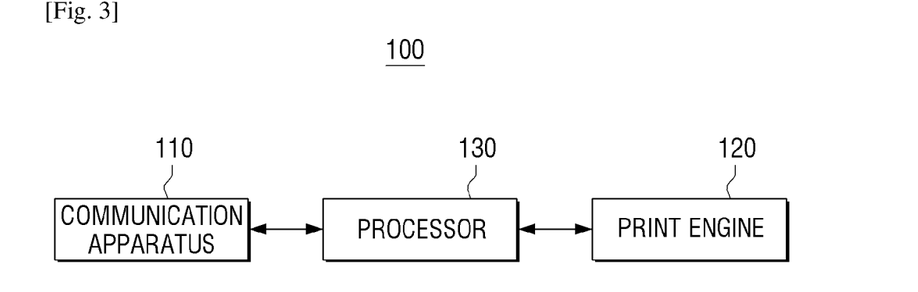
FIG. 3 is a block diagram illustrating a brief configuration of an image forming apparatus, according to an example.

FIG. 3 is a block diagram illustrating a brief configuration of an image forming apparatus, according to an example.

Referring to FIG. 3, the image forming apparatus 100 may include a communication apparatus 110, a print engine 120, and a processor 130. The communication apparatus 110 may connect the image forming apparatus 100 to an external apparatus, and may be connected via not only a local area network (LAN) or the Internet but also a universal serial bus (USB) port or a wireless communication (e.g., Wi-Fi 802.11a/b/g/n, near field communication (NFC), Bluetooth, etc.) port. The communication apparatus 110 may be referred to as a "transceiver."

The communication apparatus 110 may receive print data and document information from the print control terminal 10. In addition, the communication apparatus 110 may transmit the received document information to the management server 200, and correspondingly receive document ID information from the management server 200.

The communication apparatus 110 may transmit, to the management server 200, a document ID corresponding to a dot pattern acquired from a scanned document. The communication apparatus 110 may transmit, to the management server 200, user information for a user who requested a job to be performed together with the document ID. Correspondingly, the communication apparatus 110 may receive, from the management server 200, a result of whether to proceed with performing a job for the scanned document.

The communication device 110 may, when data (e.g., scan data) by the request of the user is generated in the image forming apparatus 100, transmit the generated scan data to a predetermined storage.

The print engine 120 may form an image. For example, the print engine 120 may print a print image generated in the processor 130 on a printing paper. The print engine 120 may perform printing using an electrophotographic method or an inkjet method. In addition, the print engine 120 may be a mono print engine capable of printing only one color, or may be a color print engine capable of color printing.

The processor 130 may control each unit within the image forming apparatus 100.

For example, the processor 130 may control the print engine 120 to perform a print job regarding received print data when the print data is received from the print control terminal 10.

The processor 130 may be implemented as one apparatus, such as a central processing unit (CPU), or may be implemented as a plurality of apparatuses, such as a clock generating circuit, a CPU, a graphic processor, and the like.

In a case in which a document tracking function is set, the processor 130 may generate a print image including an intrinsic dot pattern for print data.

As an example, the processor 130 may control the communication apparatus 110 to transmit document information received from the print control terminal 10 to the management server 200, and receive unique document ID information corresponding to the document information from the management server 200. In an implementation, the document ID may be directly generated in the image forming apparatus 100. In this case, the processor 130 may store the generated document ID information and the received document information in a memory 140.

In addition, the processor 130 may generate an intrinsic dot pattern having the received document ID information. In the example described above, a dot pattern is used. However, in another example, it is possible to use a pattern or code which is capable of including particular information such as a barcode, a QR code, and the like. In addition, in an implementation, the processor 130 may have information relating to a security term for a document, and generate a dot pattern including not only document ID information but also information relating to a security term.

In addition, in an implementation, the processor 130 may generate a plurality of dot patterns including different information. For example, a first dot pattern may include document ID information and a second dot pattern may include information included in document information, such as information relating to a user who printed a document, security term information, and the like.

In addition, the processor 130 may generate a print image having a dot pattern. For example, the processor 130 may generate a print image by performing rendering for print data, and generate a print image having a dot pattern by merging the generated print image with a dot pattern. The processor 130 may add a dot pattern fixed to a predetermined position, determine a region in which the dot pattern does not overlap with an image or text in print data by analyzing the print data, and position the dot pattern in the determined region.

In addition, the processor 130 may generate a print image having a yellow dot pattern when the print image is generated. In an example, colors other than yellow may be used, and the dot size may also vary depending on the performance (e.g., resolution) of the image forming apparatus 100.

In addition, the processor 130 may control the print engine 120 to print the generated print image. In a case in which a job requested by a user involves a plurality of pages, the processor 130 may control the print engine 120 to print an image of which each of the plurality of pages has a dot pattern.

Although the above example illustrates and explains a simple constitution of an image forming apparatus, various other units may be additionally included. An example of such additional units will be described below with reference to FIG. 4.

Figure 4:
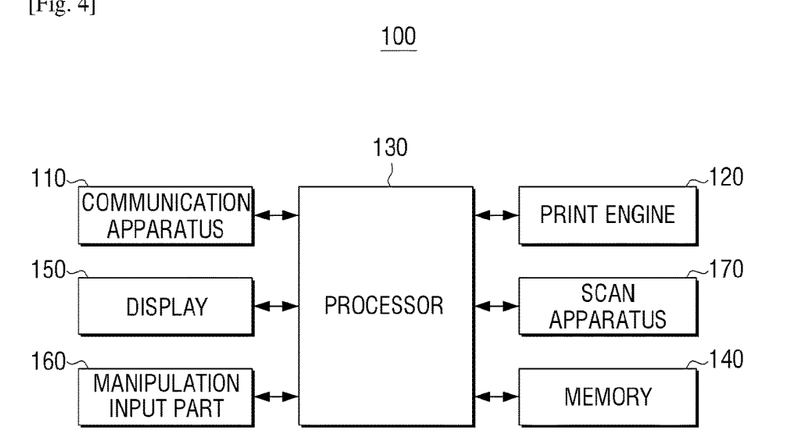
FIG. 4 is a block diagram illustrating a more detailed configuration of an image forming apparatus, according to an example.

FIG. 4 is a block diagram illustrating a more detailed configuration of an image forming apparatus, according to an example.

Referring to FIG. 4, the image forming apparatus 100 may include the communication apparatus 110, the print engine 120, the processor 130, a memory 140, a display 150, a manipulation input part 160, and a scan apparatus 170.

Examples of operations of the communication apparatus 110 and the print engine 120 are explained with reference to FIG. 3, and thus a repeated explanation is omitted. In addition, example operations of the processor 130 that were explained in FIG. 3 will not be further explained below for the sake of brevity. Only added elements in FIG. 4 will be explained below.

The memory 140 may store a program for driving the image forming apparatus 100. In addition, the memory 140 may store received print data and document information corresponding to the print data. In addition, the memory 140 may store ID information received from the management server 200, and store a dot pattern generated correspondingly to the ID information.

In a case in which a document ID is generated in the image forming apparatus 100 itself, the memory 140 may store the generated document ID and document information corresponding to the document ID. In addition, the memory 140 may store the generated scan image.

The memory 140 may be implemented by a storage medium in the image forming apparatus 100 or an external storage medium, for example, a removable disk including a USB memory or a web server through a network.

The display 150 may display a user interface window to select a function supported by the image forming apparatus 100. As an example, the display 150 may display a user interface window to select various functions provided by the image forming apparatus 100. The display 150 may be a monitor such as an liquid crystal display (LCD), a cathode ray tube (CRT), a light emitting diode (LED), an organic LED (OLED), and the like, and may also be implemented as a touch screen which is capable of simultaneously carrying out the functions of the manipulation input part 160 which will be described later.

In a case in which a user scans or copies a manuscript including a dot pattern, the display 150 may display a message or information indicating that the corresponding document is a security document.

In addition, the display 150 may display a message indicating that it is necessary to perform authentication to use the image forming apparatus 100. For example, the display 150 may display a message requesting input of an RFID tag or log information for authentication.

The manipulation input part 160 may receive an input of a user's function selection and a control command for the corresponding function. The function may include printing, copying, scanning, fax transmission, and the like. Such a function control command may be received through a control menu displayed in the display 150.

The scan apparatus 170 may read a manuscript. In an example, the scan apparatus 170 may scan a manuscript loaded onto a flatbed or an automatic document feeder (ADF).

When a job performance request such as a scan command, a copy command, or the like for a manuscript is received, the processor 130 may control the scan apparatus 170 such that a scan job is performed in the scan apparatus 170.

In addition, the processor 130 may generate a scan image based on a signal output from the scan apparatus 170. When a scan image is generated, the processor 130 may identify whether a dot pattern is present in the scan image. For example, as described above, in a case in which a dot pattern is printed in yellow color, the processor 130 may identify an area in yellow in the scan image, and identify whether a dot pattern is present in the area in yellow.

When a dot pattern is not present, the processor 130 may perform a job requested by the user. For example, in a case in which the user's requested job is a copy job, the processor 130 may control the print engine 120 to perform printing for the generated scan image. In this case, the processor 130 may, as described with reference to FIG. 3, generate a unique dot pattern for a current scan image, and control the print engine 120 to print a scan image including the generated dot pattern.

If a dot pattern is present in the scan image, the processor 130 may not perform a job requested by the user according to a system setting, or may selectively perform the requested job after document information is identified.

In an example, in a case in which a system setting indicates that a user job is not to be performed, the processor 130 may control the display 150 to display a message indicating that scanning or copying of the corresponding manuscript is unavailable. Also, the processor 130 may acquire a document ID from a dot pattern, and control the communication apparatus 110 to transmit the acquired document ID and information relating to a current user to the management server 200.

In a case of selectively processing a requested job after document information is identified, the processor 130 may acquire a document ID from the dot pattern, and identify document information corresponding to the acquired document ID.

For example, in a case in which document information is stored in the image forming apparatus 100, the processor 130 may search for document information corresponding to the acquired document ID from among the document information stored in the memory 140, and determine whether it is possible to perform a user's requested job by using the found document information. In an example, the processor 130 may compare a security term in the document information with a current date and determine whether it is possible to perform a user's requested job.

In a case in which document information is stored in the management server 200, the processor 130 may control the communication apparatus 110 to transmit the acquired ID information to the management server 200, and determine whether a user's requested job is to be performed according to the result of a determination by the management server 200. The processor 130 may control the communication apparatus 110 to transmit the acquired ID information together with information relating to a current user.

When it is determined that it is not possible to perform a user job, the processor 130 may control the display 150 to display a message indicating that it is not possible to perform a user's requested job. When it is determined that it is possible to perform a user job, the processor 130 may perform a user's requested job. The processor 130 may perform a predetermined image process for the generated scan image, and perform a user's requested job by using the scan image for which the image process is performed.

The predetermined image process may be transforming a color image into a black and white image, may be an image process such as inserting a predetermined phrase to a predetermined position in the scan image as a watermark, and the like.

As described above, the image forming apparatus 100 according to an example may print a print image including a unique dot pattern when print data is printed, thereby enabling tracking of a printout.

In the examples described with reference to FIGS. 3 and 4, a print job is performed so that all documents have a dot pattern. However, in other examples, it is possible that a print job is performed so that a dot pattern is selectively present in a particular document. For example, the job described above may be performed only when a grade of a document is classified as a security document or an expression such as "security document" or "confidential" is included in the document.

In FIGS. 3 and 4, an apparatus generating a dot pattern and an apparatus sensing a dot pattern are performed in a single image forming apparatus. However, the apparatus generating a dot pattern and an apparatus sensing a dot pattern may be different apparatuses. In addition, an apparatus sensing a dot pattern may be an image scanning apparatus including only a scan apparatus.

Figure 5:
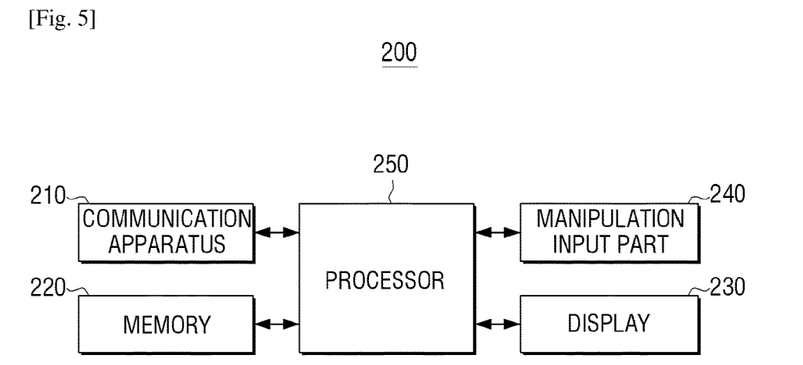
FIG. 5 is a block diagram illustrating a management server, according to an example.

FIG. 5 is a block diagram illustrating a management server, according to an example.

Referring to FIG. 5, the management server 200 may include a communication apparatus 210, a memory 220, a display 230, a manipulation input part 240, and a processor 250.

The communication apparatus 210 may be formed to connect the management server 200 to an external apparatus, and may be connected via not only a local area network (LAN) or the Internet but also a universal serial bus (USB) port or a wireless communication (e.g., Wi-Fi 802.11a/b/g/n, near field communication (NFC), Bluetooth, etc.) port. The communication apparatus 210 may be referred to as a "transceiver."

The communication apparatus 210 may receive document information from the image forming apparatus 100. In addition, the communication apparatus 210 may transmit document ID information generated in the processor 250 to the image forming apparatus 100 in response to receiving document information. The communication apparatus 210 may transmit the received document information to the mobile apparatus 300, and receive modified document information from the mobile apparatus 300.

In addition, the communication apparatus 210 may receive document ID information from the image forming apparatus 100. The communication apparatus 210 may receive, from the image forming apparatus 100, information about a user who requested a job to be performed and/or a job requested by the user. In addition, the communication apparatus 210 may, in response to receiving document ID information, transmit a result of whether a requested job may be performed or document information corresponding to document ID information to the image forming apparatus 100. The communication apparatus 210 may transmit the received document ID information and document information corresponding to the document ID information to the mobile apparatus 300.

The memory 220 may store a program for driving the management server 200. In addition, the memory 220 may correlate document information received via the communication apparatus 210 with a document ID generated in the processor 250 and store the correlated information. For example, the memory 220 may store a plurality of document IDs and document information corresponding to each of the plurality of document IDs in a database form.

The memory 220 may be implemented by a storage medium in the management server 200 or an external storage medium, for example, a removable disk including a USB memory or a web server through a network.

The display 230 displays a user interface window to select a function supported by the management server 200. The display 230 may be a monitor such as an LCD, a CRT, an LED, an OLED, and the like, and may also be implemented as a touch screen which is capable of simultaneously carrying out the functions of the manipulation input part 240 which will be described later.

The display 230 may display a user interface window for receiving a schedule. For example, when document information is received from the image forming apparatus 100, the display 230 may display a message requesting setting of a security term for the received document information and setting of whether a secondary job is available. On the other hand, during implementation, such a display operation may be performed in the mobile apparatus 300.

In addition, when a document having a dot pattern is scanned and a document ID is received from the image forming apparatus 100, the display 230 may display a message indicating that a secondary job for a security document has been requested together with document information corresponding to the received document ID. On the other hand, during implementation, such a display operation may be performed in the mobile apparatus 300.

The manipulation input part 240 may receive settings as to a security term for document information and whether a secondary job is available from a user.

The processor 250 may control each unit within the management server 200. For example, when document information is received from the image forming apparatus 100, the processor 250 may generate a unique document ID corresponding to the received document information, and control the communication apparatus 210 to transmit the generated document ID to the image forming apparatus 100.

In addition, the processor 250 may store the generated document ID and the document information in the memory 220.

In addition, when the document ID is received, the processor 250 may control the display 230 in such a manner that an item of information relating to the document ID may be added or updated by a user. Alternatively, in a case in which a manager performs the above-described job through the mobile apparatus 300, the processor 250 may control the communication apparatus 210 to transmit the received document ID to the mobile apparatus 300.

When the document ID is updated by the manager, the processor 250 may update document information stored in the memory 220.

When a document ID is received from the image forming apparatus 100, the processor 250 may acquire document information corresponding to the received document ID from among the document information stored in the memory 220, and determine whether it is possible to perform a user job in the image forming apparatus 100 based on the acquired document information.

In addition, the processor 250 may control the communication apparatus 210 to notify a result regarding the determined job availability. In addition, the processor 250 may store use history details in the memory 220. The processor 250 may correlate the above-described use history information with the pre-stored document information and store the correlated information.

As described above, the management server 200 according to an example may generate a unique document ID corresponding to document information, and database the document information and the generated document ID and store them, thereby enabling tracking of a document printed in the image forming apparatus 100.

Figure 6:
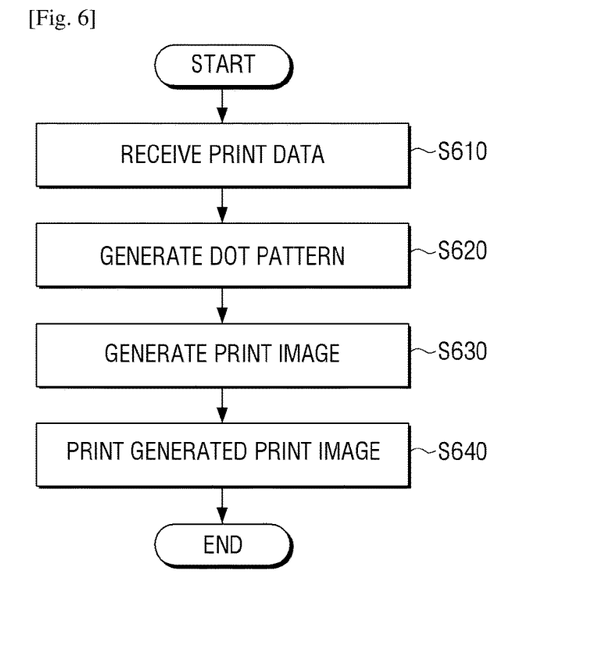
FIG. 6 is a flowchart provided to explain a method for controlling printing in an image forming apparatus, according to an example.

FIG. 6 is a flowchart provided to explain a method for controlling printing in an image forming apparatus, according to an example.

Referring to FIG. 6, print data may be received at operation S610. For example, it is possible to receive print data from the print control terminal 10 or to receive a scan image generated through a scan apparatus as print data. In this regard, it is possible to receive document information together with the print data. In an example, if a scan image is received, login information of a user may be received as document information.

In addition, an intrinsic dot pattern for the print data may be generated at operation S620. For example, it is possible to transmit document information corresponding to the print data to a management server, and receive document ID information corresponding to the document information. In addition, a dot pattern including the document ID information may be generated.

In addition, a print image including a dot pattern may be generated using the generated dot pattern and the print data, at operation S630. For example, it is possible to generate a print image by performing rendering of the print data, and add the generated dot pattern to a predetermined position of the print image or the determined position and generate the print image including the dot pattern. The generated dot pattern may be in yellow which is difficult to identify with the naked eye.

In addition, the generated print image may be printed at operation S640. In an example, the print engine 120 may be controlled to print the generated print image.

As described above, a print control method according to an example may print a print image including a unique dot pattern at the time of printing print data. Thus, it is possible to not only prevent a second job for a printout having a dot pattern from being carried out, but also track job history for the corresponding printout.

The print control method described above may be implemented as a program and provided to an image forming apparatus. For example, the program including a print controlling method according to examples may be stored in a non-transitory computer readable medium and provided therein.

Figure 7:
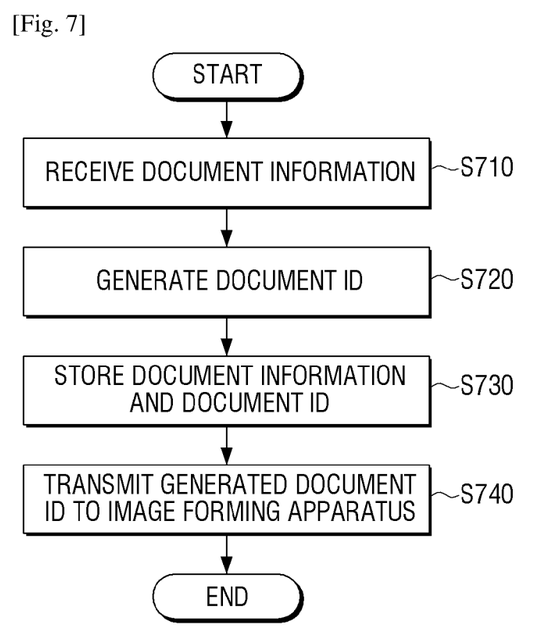
FIG. 7 is a flowchart provided to explain a method for managing printing history in a management server, according to an example.

FIG. 7 is a flowchart provided to explain a method for managing printing history in a management server, according to an example.

Referring to FIG. 7, document information may be received from the image forming apparatus 100, at operation S710.

A unique document ID corresponding to the document information may be generated at operation S720, and the generated document ID and the received document information may be stored in the memory 220 of the management server 200, at operation S730.

Information relating to the generated document ID may be sent to the image forming apparatus 100 from which the document information is received, at operation S740.

As described above, a print history management method according to an example may generate a unique document ID corresponding to document information, and correlate the document information and the generated document ID, and store them, thereby enabling tracking of a document printed in the image forming apparatus 100.

The print history management method described above may be implemented as a program and provided to a management server. In an example, the program including a print history management method according to examples may be stored in a non-transitory computer readable storage medium and provided therein. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disk (SSD), and any device that may store instructions or software, related data, data files, and data structures and may provide instructions or software, related data, data files, and data structures to a processor or a computer to allow the processor or the computer to execute instructions.

The foregoing examples and advantages are merely exemplary and are not to be construed as limiting the present disclosure. The present teaching can be readily applied to other types of apparatuses. Also, the description of the examples of the present disclosure is intended to be illustrative, and not to limit the scope of the claims, and many alternatives, modifications, and variations will be apparent to those skilled in the art.

The invention claimed is:

1. An image forming apparatus, comprising:
a print engine;
a communication apparatus to receive print data;
a scan apparatus to scan a manuscript; and
a processor to:
generate an intrinsic dot pattern for the print data;
generate a print image including the intrinsic dot pattern by using the generated intrinsic dot pattern and the print data;
control the print engine to print the generated print image;
generate a scan image based on a signal output from the scan apparatus in response to a request for job performance; and
based on a dot pattern being present in the generated scan image, determine whether to proceed with the requested job performance based on a document ID included in the dot pattern.

2. The image forming apparatus as claimed in claim 1, wherein the communication apparatus:
receives document information for the print data;
transmits the received document information to a management server; and
receives intrinsic document ID information corresponding to the document information from the management server, and
wherein the processor generates the intrinsic dot pattern including the received document ID information.

3. The image forming apparatus as claimed in claim 2, wherein the document information comprises at least one of generator information of a document corresponding to the print data, name information of the document, generation date information of the document, or security term information of the document.

4. The image forming apparatus as claimed in claim 2,
wherein the intrinsic dot pattern including the received document ID information comprises a first intrinsic dot pattern, and
wherein the processor generates a second intrinsic dot pattern including the received document information for the print data.

5. The image forming apparatus as claimed in claim 1,
wherein the communication apparatus receives document information for the print data,
wherein the processor generates intrinsic document ID information corresponding to the document information, and
wherein the intrinsic dot pattern includes the document ID information.

6. The image forming apparatus as claimed in claim 5, further comprising:
a memory to store the received document information and the generated document ID information.

7. The image forming apparatus as claimed in claim 1, wherein the processor generates the print image of which the intrinsic dot pattern color is yellow.

8. The image forming apparatus as claimed in claim 1, further comprising:
a memory to store document information and document ID information corresponding to the document information,
wherein the processor:
searches for document information corresponding to the document ID included in the dot pattern from among document information stored in the memory; and
determines whether to proceed with the requested job performance based on security term information in the found document information.

9. The image forming apparatus as claimed in claim 1, wherein the processor:
controls the communication apparatus to transmit the document ID included in the dot pattern to a management server; and
determines whether to proceed with the requested job performance based on an approval result received from the management server.

10. The image forming apparatus as claimed in claim 9, wherein the processor controls the communication apparatus to transmit, to the management server, information about a user who requested the job performance.

11. The image forming apparatus as claimed in claim 1, further comprising:
a display,
wherein the processor, based on determining that the job performance is not to proceed, controls the display to display a message indicating that performing the job is not possible.

12. The image forming apparatus as claimed in claim 1, wherein the processor:
based on determining that the job performance is to proceed, performs a predetermined image process for the scan image; and
proceeds with the requested job performance using a scan image for which the predetermined image process is performed.

13. The image forming apparatus of claim 1, wherein the intrinsic dot pattern includes a bar code or a quick response code.

14. A non-transitory computer-readable recording medium including instructions for executing a print control method, the non-transitory computer-readable recording medium comprising:
instructions for receiving print data;
instructions for generating an intrinsic dot pattern for the print data;
instructions for generating a print image including the dot pattern by using the generated dot pattern and the print data;
instructions for controlling a print engine to print the generated print image;
instructions for generating a scan image based on a signal output from a scan apparatus in response to a request for job performance; and
instructions for, based on a dot pattern being present in the generated scan image, determining whether to proceed with the requested job performance based on a document ID included in the dot pattern.

15. An image forming apparatus, comprising:
a print engine;
a communication apparatus;
a scan apparatus to scan a manuscript; and
a processor to:
generate a scan image based on a signal output from the scan apparatus in response to a request for job performance; and
based on a dot pattern being present in the generated scan image, determine whether to proceed with the requested job performance based on a document ID included in the dot pattern.

16. The image forming apparatus as claimed in claim 15, further comprising:

a memory to store document information and document ID information corresponding to the document information, wherein the processor:

searches for document information corresponding to the document ID included in the dot pattern from among document information stored in the memory; and determines whether to proceed with the requested job performance based on security term information in the found document information.

17. The image forming apparatus as claimed in claim 15, wherein the processor:

controls the communication apparatus to transmit the document ID included in the dot pattern to a management server; and determines whether to proceed with the requested job performance based on an approval result received from the management server.

18. The image forming apparatus as claimed in claim 17, wherein the processor controls the communication apparatus to transmit, to the management server, information about a user who requested the job performance.

19. The image forming apparatus as claimed in claim 15, further comprising:

a display, wherein the processor, based on determining that the job performance is not to proceed, controls the display to display a message indicating that performing the job is not possible.

20. The image forming apparatus as claimed in claim 15, wherein the processor:

based on determining that the job performance is to proceed, performs a predetermined image process for the scan image; and proceeds with the requested job performance using a scan image for which the predetermined image process is performed.

\* \* \* \* \*